United States Patent
Bauer et al.

(10) Patent No.: US 6,407,055 B1
(45) Date of Patent: Jun. 18, 2002

(54) CRYSTALLINE ALKALI METAL PHYLLOSILICATE

(75) Inventors: Harald Bauer, Kerpen; Josef Holz; Günther Schimmel, both of Erftstadt, all of (DE)

(73) Assignee: Clariant GmbH, Frankfurt (DE)

( * ) Notice: Subject to any disclaimer, the term of this patent is extended or adjusted under 35 U.S.C. 154(b) by 93 days.

(21) Appl. No.: 09/659,388

(22) Filed: Sep. 11, 2000

(30) Foreign Application Priority Data

Sep. 11, 1999 (DE) .......................................... 199 43 470

(51) Int. Cl.⁷ .............................. C11D 3/08; C11D 7/14
(52) U.S. Cl. ...................... 510/511; 510/276; 510/511; 510/531; 423/326; 423/328.2; 423/334
(58) Field of Search .................................. 510/276, 511, 510/531; 423/326, 328.2, 334

(56) References Cited

U.S. PATENT DOCUMENTS

| 4,664,839 A | 5/1987 | Rieck ..................... 252/175 |
| 5,614,161 A | * 3/1997 | Wilkens et al. ............. 423/332 |

FOREIGN PATENT DOCUMENTS

| DE | 44 01 527 | 7/1995 |
| DE | 196 01 063 | 9/1996 |
| EP | 0 164 514 | 12/1985 |
| EP | 0 486 078 | 5/1992 |
| EP | 0 486 079 | 5/1992 |
| EP | 0 550 048 | 7/1993 |
| WO | WO 96/01307 | 1/1996 |

OTHER PUBLICATIONS

German Search Report.
Derwent Patent Family Abstract for DE 44 01 527.
Derwent Patent Family Abstract for JP 10291817.

* cited by examiner

*Primary Examiner*—Charles Boyer
(74) *Attorney, Agent, or Firm*—Richard P. Silverman

(57) ABSTRACT

The invention relates to a crystalline alkali metal phyllosilicate of the formula $$aM^I{}_2O \cdot bEO_2 \cdot cX_2O_5 \cdot dZO_3 \cdot SiO_2 \cdot eH_2O,$$

in which $M^I$ is an alkali metal, E is an element of the fourth main group, X is an element of the fifth main group and Z is an element of the sixth main group of the Periodic Table of the Elements and the following also applies:

$0.25 \leq a \leq 6.25$
$2.5 \cdot 10^{-4} \leq b \leq 5.63$
$0 \leq c \leq 2.81$
$0 \leq d \leq 5.63$
$0 \leq e \leq 15.3$.

The invention also relates to a process for the preparation of this crystalline alkali metal phyllosilicate and also to detergents and cleaners which comprise the crystalline alkali metal phyllosilicate according to the invention.

27 Claims, No Drawings

CRYSTALLINE ALKALI METAL PHYLLOSILICATE

CROSS-REFERENCES TO RELATED APPLICATIONS

The present invention is described in the German priority application No. 19943470.0, filed Sep. 11, 1999, which is hereby incorporated by reference as is fully disclosed herein.

BACKGROUND OF THE INVENTION

The invention relates to a crystalline alkali metal phyllosilicate, to a process for its preparation, and to detergents and cleaners which comprise the crystalline alkali metal phyllosilicate according to the invention.

Crystalline sheet sodium silicates (phyllosilicates) of the formula $NaMSi_xO_{2x}yH_2O$, where M is sodium or hydrogen, x is a number from 1.9 to 4 and y is a number from 0 to 20 and preferred values for x are 2, 3 or 4, have proven suitable replacements for the detergent builders phosphate and zeolite. The use of such crystalline phyllosilicates for the softening of water is described, for example, in EP-B-0 164 514.

A crystalline phyllosilicate doped with phosphorus is described in DE-A-1 96 01 063. A crystalline sodium phyllosilicate of the formula $xNa_2O*ySiO_2*zP_2O_5$ where the x to y ratio is from 0.35 to 0.6, the x to z ratio is from 1.75 to 1200 and the y to z ratio is from 4 to 2800 is claimed therein.

A granulate of crystalline sodium phyllosilicate with an $SiO_2/Na_2O$ molar ratio of from 1.7 to 4.1:1 and moisture-absorbing substances is described in JP-A-10291817. To obtain such a granulate, a mixture of 80% by weight of sodium silicate ($SiO_2/Na_2O$ molar ratio of 2) and 20% by weight of $Na_2CO_3$ was compacted, ground and classified.

Detergent builders fulfill a large number of functions. Of these, particular mention is to be made of the removal of or reduction in water hardness and the supplying of alkalinity, i.e. the increase in the pH of the wash liquor. The removal of water hardness is usually measured by measuring the calcium-binding capacity (CBC, see general procedure "Determination of the calcium-binding capacity"). Builder performance is a summary parameter which, inter alia, includes calcium-binding capacity and alkalinity. It is usually determined in practical washing experiments in washing machines (see general procedure "Determination of detergency" and "Determination of inorganic incrustation").

The removal of the water hardness present in mains water is important since, at the customary, in particular relatively high, washing temperatures, they cause inorganic incrustations on heating elements, walls of washing machines and textiles, and cause the anionic surfactants often used to precipitate out in the form of so-called lime soaps. This results not only in a reduction in detergency but also produces a gray haze on the laundry after just a few wash cycles. Inorganic incrustations consist of water hardness precipitated out in the form of calcium carbonate, or of deposited residues of dissolved detergent builder components. The (desired) increase in the pH in the wash solution results in the dirt particles having a higher surface charge, thus facilitating their removal from the fabric.

In addition, a builder should not produce too many deposits on the textiles as a result of undissolved builder residues. This is usually determined by the solubility test (see general procedure "Solubility test").

It is known that the addition of carbonate to mains water effects the precipitation of calcium carbonate with the formation of harmful deposits on the washing machine and incrustations in the textiles. For this reason, the person skilled in the art uses builder substances for detergents in order to remove calcium and magnesium from mains water.

However, there has hitherto been a lack of suitable substances which are able to satisfy all of the abovementioned requirements.

Surprisingly, we have now found that phyllosilicates, as a result of certain incorporated substances, achieve the required performance more than expected or even improve upon it and, in particular, counteract the formation of precipitates (solubility) which is to be expected.

SUMMARY OF THE INVENTION

The object of the present invention is therefore to provide a crystalline alkali metal phyllosilicate which, compared with the prior art, has increased water-softening ability, improved builder performance and results in a reduced formation of residues.

DESCRIPTION OF THE PREFERRED EMBODIMENTS

The object is achieved by a crystalline alkali metal phyllosilicate of the formula $$aM^I_2O.bEO_2.cX_2O_5.dZO_3.SiO_2.eH_2O,$$

in which $M^I$ is an alkali metal, E is an element of the fourth main group, X is an element of the fifth main group and Z is an element of the sixth main group of the Periodic Table of the Elements and the following also applies:

$0.25 \leq a \leq 6.25$ $2.5 \cdot 10^{-4} \leq b \leq 5.63$ $0 \leq c \leq 2.81$ $0 \leq d \leq 5.63$ $0 \leq e \leq 15.3$.

Preferably, $0.25 \leq a \leq 6.25$ $2.5 \cdot 10^{-4} \leq b \leq 5.63$ $1.25 \cdot 10^{-4} \leq c \leq 2.81$ $2.4 \cdot 10^{-4} \leq d \leq 5.63$ $0 \leq e \leq 15.3$.

Preferably, $0.5 \leq a \leq 0.73$ $3.6 \cdot 10^{-3} \leq b \leq 0.086$ $2.56 \cdot 10^{-4} \leq c \leq 0.5$ $3.6 \cdot 10^{-3} \leq d \leq 0.086$ $0 \leq e \leq 0.25$.

Preferably, $0.5 \leq a \leq 0.63$ $8.6 \cdot 10^{-3} \leq b \leq 0.043$ $1.29 \cdot 10^{-3} \leq c \leq 0.025$ $8.6 \cdot 10^{-3} \leq d \leq 0.043$ $0 \leq e \leq 0.25$.

Preferably, d=0 and $0.25 \leq a \leq 6.25$ $2.5 \cdot 10^{-4} \leq b \leq 5.63$ $1.25 \cdot 10^{-4} \leq c \leq 2.81$ $3.13 \cdot 10^{-4} \leq e \leq 15.3$.

Preferably, d=0 and
0.5≦a≦0.6
3.6·10⁻³≦b≦0.086
2.56·10⁻⁴≦c≦0.5
0≦e≦0.29.
Preferably,
d=0 and
0.52≦a≦0.58
8.6·10⁻³≦b≦0.043
1.29·10⁻³≦c≦0.025
0≦e≦0.29.
In another embodiment of the invention,
c=0 and
0.25≦a≦6.25
2.5·10⁻⁴≦b≦5.63
2.5·10⁻⁴≦d≦5.63
0≦e≦12.5.
Preferably,
c=0 and
0.51≦a≦0.7
3.6·10⁻³≦b≦0.086
3.6·10⁻³≦d≦0.086
0≦e≦0.29.
Preferably,
c=0 and
0.51≦a≦0.59
8.6·10⁻³≦b≦0.043
8.6·10⁻³d≦0.043
0≦e≦0.29.
In a further embodiment of the invention,
c=0 and d=0 and
0.25≦a≦6.25
2.5·10⁻⁴≦b≦5.63
0≦e≦12.5.
Preferably,
c=0 and d=0 and
0.5≦a≦0.59
3.6·10⁻³≦b≦0.086
0≦e≦0.29.
Preferably,
c=0 and d=0 and
0.51≦a≦0.54;
8.59·10⁻³≦b≦0.043;
0≦e≦0.26.

The alkali metal ($M^I$) is preferably lithium, sodium, potassium, cesium or mixtures thereof.

The alkali metal ($M^I$) is particularly preferably sodium and/or potassium.

The element of the fourth main group (E) is preferably carbon, germanium, tin, lead or mixtures thereof. The element of the fourth main group (E) is particularly preferably carbon.

The element of the fifth main group (X) is preferably nitrogen, phosphorus, arsenic, antimony, bismuth or mixtures thereof.

The element of the fifth main group (X) is particularly preferably phosphorus.

The element of the sixth main group (Z) is preferably sulfur, selenium, tellurium or mixtures thereof.

The element of the sixth main group (Z) is particularly preferably sulfur.

The crystalline alkali metal phyllosilicate according to the invention preferably additionally comprises up to 10% by weight of foreign constituents.

The foreign constituents are preferably compounds of alkaline earth metal ions (magnesium, calcium, strontium, barium), aluminum, zinc, iron, titanium, vanadium, chromium, manganese, cobalt, nickel, boron, fluoride, chloride, bromide and/or iodide.

The present object is also achieved by a process for the preparation of crystalline alkali metal phyllosilicates of the formula

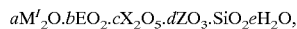

$aM^I_2O.bEO_2.cX_2O_5.dZO_3.SiO_2eH_2O$, in which $M^I$ is an alkali metal, E is an element of the fourth main group, X is an element of the fifth main group and Z is an element of the sixth main group of the Periodic Table of the Elements and the following also applies: 0.25≦a≦6.25;

2.5·10⁻⁴≦b≦5.63; 0≦c≦2.81; 0≦d≦5.63; 0≦e≦15.3, which comprises mixing a sodium silicate-containing starting material with one or more compounds which comprise the components $M^I$, E, X and/or Z, and then heat-treating the mixture. As regards the meaning of components $M^I$, E, X and Z, reference may be made to the above explanations. This likewise applies for the preferred embodiments. With regard to components $M^I$, E, X and/or Z, the mixture preferably has a composition which corresponds to the composition of the alkali metal phyllosilicates according to the invention.

The sodium silicate-containing starting material is preferably an alkali metal water glass or spray-dried amorphous sodium silicate. Solid water glasses are likewise suitable.

The process is preferably carried out by mixing alkali metal water glasses with alkali metal carbonate, alkali metal sulfate and/or alkali metal phosphates, spray-drying the resulting product and then heat-treating it.

In another process according to the invention, spray-dried amorphous sodium silicate is mixed with alkali metal carbonate, alkali metal sulfate and/or alkali metal phosphates and then heat-treated.

The heat treatment is preferably carried out at temperatures of from 700 to 1300 K.

The heat treatment is preferably carried out at temperatures of from 800 to 1200 K.

The heat treatment is particularly preferably carried out at temperatures of from 900 to 1100 K.

The period of heat treatment is unimportant, and can be from a few minutes to several hours. Preference is given to a heat-treatment time of from 60 min to 120 min. A heat-treatment time of 1 h usually suffices.

The invention also relates to a detergent and cleaner which comprises a crystalline alkali metal phyllosilicate according to the invention.

The detergent and cleaner preferably comprises
0.5 to 90% by weight of the crystalline alkali metal phyllosilicate
0.5 to 70% by weight of cobuilders
ad 100% by weight of further customary ingredients.
The detergent and cleaner preferably comprises
0.5 to 90% by weight of the crystalline alkali metal phyllosilicate
0.5 to 60% by weight of surfactant
ad 100% by weight of further customary ingredients.
The detergent and cleaner preferably comprises
0.5 to 90% by weight of the crystalline alkali metal phyllosilicate 0.5 to 60% by weight of bleaching-active agents
ad 100% by weight of further customary ingredients.
The detergent and cleaner preferably comprises
0.5 to 90% by weight of the crystalline alkali metal phyllosilicate
0.5 to 70% by weight of cobuilders
0.5 to 60% by weight of surfactant
ad 100% by weight of further customary ingredients.
The detergent and cleaner preferably comprises
0.5 to 90% by weight of the crystalline alkali metal phyllosilicate
0.5 to 70% by weight of cobuilders
0.5 to 60% by weight of bleaching-active agents
ad 100% by weight of further customary ingredients.
The detergent and cleaner preferably comprises
0.5 to 90% by weight of the crystalline alkali metal phyllosilicate
0.5 to 70% by weight of cobuilders
0.5 to 60% by weight of surfactant
0.5 to 60% by weight of bleaching-active agents
ad 100% by weight of further customary ingredients.
The detergent and cleaner preferably comprises
0.5 to 90% by weight of the crystalline alkali metal phyllosilicate
0.5 to 70% by weight of electrolyte donor
ad 100% by weight of further customary ingredients.
The detergent and cleaner preferably comprises
50 to 99% by weight of the crystalline alkali metal phyllosilicate
0.01 to 10% by weight of dye
ad 100% by weight of further customary ingredients.

The cobuilders are preferably crystalline aluminosilicates, mono-, oligo- or polymeric carboxylic acids, alkali metal carbonates, alkali metal ortho-, pyro- and polyphosphates, crystalline alkali metal silicates having a crystal lattice without a sheet structure and/or amorphous alkali metal silicates.

The bleaching-active agents are preferably perborates, percarbonates and/or enzymes. Suitable enzymes are, for example, peroxidases and reductases.

The surfactants are preferably anionic, cationic, nonionic and/or zwitterionic surfactants.

The electrolyte donors are preferably sulfates, chlorides and/or borates.

In the case of the abovementioned detergents and cleaners, the crystalline alkali metal phyllosilicate according to the invention can preferably be present in an amount of from 1 to 50% by weight and particularly preferably in an amount of from 1 to 30% by weight. In another embodiment of the invention, it is preferably present in an amount of from 60 to 98% by weight and particularly preferably in an amount of from 70 to 98% by weight.

The abovementioned alkali metals ($M^I$) can be introduced into the sodium silicate-containing starting material via any form of chemical compound provided the final product has the composition according to the invention. In this connection, these chemical compounds may optionally also comprise the other components E, X, Z, Si and $H_2O$.

The elements of the fourth main group (E), such as carbon, germanium, tin and/or lead, carbon being particularly preferred, can likewise be introduced into the sodium silicate-containing starting material via any form of chemical compound provided the final product has the composition according to the invention. Here, the carbon is preferably in the form of carbonate ions. In the preparation according to the invention, carbon can be used directly as carbonate or in another form provided carbonate is produced during the preparation process. Examples of possible compounds for this purpose are oxalates, citrates, acetates, organic salts and organyls. In this connection, these compounds may optionally also comprise the other components $M^I$, X, Z, Si and $H_2O$ provided the final product has the composition according to the invention.

The element of the fifth main group (X), which includes nitrogen, phosphorus, arsenic, antimony and bismuth, can likewise be introduced via any suitable chemical compound provided the composition according to the invention is produced in the final product or else during the preparation process. In this connection, the other components $M^I$, E, Z, Si and $H_2O$ can again be present in the composition.

The particularly preferred element of the fifth main group is phosphorus. This is preferably in the form of phosphate, oligophosphate or polyphosphate ions. In the preparation according to the invention, phosphorus can be used directly as mono-, oligo- or polyphosphate, particular preference being given here to phosphoric acid, dihydrogenphosphates, hydrogenphosphates, phosphates with mixed cations, orthophosphates, pyrophosphates or polyphosphates, phosphate-containing double salts, phosphites, phosphines or other suitable compounds.

With regard to the general formula, D is an element of the sixth main group, e.g. sulfur, selenium, tellurium. Particular preference is given to sulfur, in particular in the form of sulfate ions. In the preparation according to the invention, sulfur can be used directly as sulfate, particular preference being given here to sulfuric acid, hydrogensulfates, sulfates and double salts or in any form of chemical compound, which can inter alia comprise the other components $M^I$, E, X, Si and $H_2O$, provided the final product has the composition according to the invention, or provided sulfate is produced in the course of the preparation process, e.g. sulfites, thiosulfates, sulfides, polysulfides etc.

With regard to the general formula, the silicon-containing component can be introduced via any compound which produces silicates in the course of the preparation process according to the invention. Particular preference is given to alkali metal water glass solutions, dried (for example) pulverulent or granular alkali metal water glasses accessible therefrom, or solid water glasses prepared by means of the customary melting process. The spray-dried amorphous sodium silicates can then also be prepared therefrom.

The $H_2O$ components are present either as water of crystallization/hydration or as silanol (Si—OH) groups.

The crystalline alkali metal phyllosilicate according to the invention comprises the E, X or Z ions in very finely divided form. It is not a simple mixture of phyllosilicates with other components, but a type of compound having a new structure, from which it is not possible to separate off the E, X or Z constituents again. Such crystalline alkali metal phyllosilicates having very finely divided contents of said other ions or compounds are hitherto unknown.

The alkali metal phyllosilicates according to the invention are composed of alternating percentage ratios [lacuna] the crystal structures of the polymorphous phases of the known sodium disilicate phases (alpha, beta, delta, epsilon phase). Contents/phases of kanemites, of mixed alkali metal silicate phases, such as e.g. $KNaSi_2O_5$, $K_{1.3}Na_{0.7}Si_2O_7$ and also $K_2Si_2O_5$ may also be present.

The process according to the invention already described above for the preparation of the crystalline alkali metal phyllosilicate provides for compounds which comprise the components $M^I$, E, X or Z and $H_2O$ in any form to be added to a sodium silicate-containing precursor and then crystallized directly or indirectly.

It is preferred to add (mix, dissolve therein) the $M^I$-, E-, X- or Z- and $H_2O$ -containing components/precursors to a liquid sodium water glass, to free the solution entirely or partially from water (drying) and subsequently or simultaneously to effect crystallization.

Suitable drying processes are inter alia spray drying, belt drying and batch drying. Suitable crystallization conditions are temperatures of from 450 to 900° C., preferably 660 to 760° C. Suitable apparatuses for the crystallization are muffle furnaces, fluidized beds, belt kilns, rotary kilns and other suitable apparatuses.

According to another process variant, it is preferable to add (for example grind together, mix, granulate, agglomerate, compact, briquette etc.) the $M^I$, E, X or Z and $H_2O$ components/precursors to a solid X-ray-amorphous water glass or silicate which has already been entirely or partially freed from water, and to subsequently or simultaneously crystallize the mixture. If desired, water can be added or removed between the mixing and crystallization step.

The crystallized material obtained by the above processes can be further processed as required.

Preference is given to the preparation of compression granulates (to a mean particle size of $d_{50}$=100 to 800 µm). For compression granulation, the processes roll compaction, briquetting and others can be used. In the case of roll compaction, a compaction pressure of from 10 $kN/cm^2$ to 100 $kN/cm^2$ is preferred and a compaction pressure of from 30 $kN/cm^2$ to 80 $kN/cm^2$ is particularly preferred. If desired, up to 10% by weight of granulation auxiliaries (for example water, water glass, polyethylene glycol, nonionic surfactants, anionic surfactants, polycarboxylate copolymers) can be added.

Preference is also given to the preparation of agglomerates. Suitable apparatuses may be any particle-constructing mixers, e.g. Lödige plowshare mixer, Eyrich mixer, Schugi mixer with downstream fluidized-bed dryer etc. If desired, granulation auxiliaries (up to 30% by weight) or other detergent ingredients can be added, such as, for example, water, waterglass, polyethylene glycol, nonionic surfactants, anionic surfactants, polycarboxylate copolymers, soil release polymer and others.

The crystalline material obtained is preferably finely ground (to $d_{50}$<100 µm). Examples of suitable apparatuses for this purpose are: ball mills, pendulum roller mills, roller mills, compressed-air mills, hammer mills and impact mills. If desired, grinding auxiliaries can be added.

Preferably, the abovementioned compression granulates can also be finely ground (to $d_{50}$<100 µm).

The crystalline alkali metal phyllosilicates according to the invention can be used according to the invention in detergents and cleaners. Preference is given here to pulverulent heavy-duty detergents, color detergents and specialty detergents. Heavy-duty detergents are balanced formulations with the aim of as high a detergency as possible. Color detergents are primarily intended to protect colored textiles with regard to bleaching and fading of the colors and felting of the fibers. Specialty detergents are aimed at narrow areas of application, such as stain-removal salts, curtain detergents, wool detergents and others.

The crystalline alkali metal phyllosilicates according to the invention can also be used in water softeners, which, particularly in regions of high water hardness, have a performance-enhancing effect on the wash result and a protective effect with regard to the washing machine.

Further applications for the crystalline alkali metal phyllosilicates according to the invention are machine dishwashing detergents. The crystalline alkali metal phyllosilicates according to the invention are suitable here primarily because of their good soil dispersion, their high alkalinity and their excellent protective effect against corrosion of glassware.

The abovementioned detergents and cleaners, water softeners and machine dishwashing detergents can be used in powder form, granulate form and tablet form. In the case of tablets, the shape can be cylindrical, cuboid, or else largely assume the desired geometric shapes. In the case of the cylinder, the radius to height ratio can be between 0.25 and 4: 1. The compaction pressure can be between 12 and 0.3 $kN/cm^2$. Preference is also given to multistage compression. Here, any desired number of layers are compressed in a plurality of steps one after the other, resulting in a plurality of layers. In the case of two-layered tablets, a volume ratio of the two layers of from 1:10 to 10:1 is particularly preferred.

Determination of the Particle Size Distribution Using a Microtrac granulometer

The particle size in the dispersion is determined using a ASVR/FRA Microtrac granulometer from Leeds and Northrup. The parameter measured is the reflection or diffraction of a laser beam upon passing through the dispersion. 400 ml of ethanol are pumped through the laser measuring cell. The solid sample (e.g. 70 mg) is automatically metered in, and after 10 minutes the particle size distribution is determined. The evaluation unit of the instrument calculates the $d_{50}$ value.

Determination of the Particle Size Distribution by Screen Analysis

The inserts having the desired screens are inserted into a screening machine from Retsch. The mesh width of the screens decreases from top to bottom. 50 g of the powder to be investigated are placed on the widest screen. As a result of the vibratory movement of the screening machine, the powder material is conveyed through the various screens. The residues on the screens are weighed and calculated relative to the initial weight of the material. The $d_{50}$ value can be calculated from the results. Results which have been determined by this method are indicated by * in the examples.

Solubility Test

For this, 800 ml of mains water (water hardness 20 degrees of German hardness) are heat-treated at 20° C. and stirred with a propeller (straight-arm) stirrer. 2 g of the test substance are added and the mixture is stirred for 20 min. Using the slight vacuum of a water-jet pump, the dispersion is sucked through a 20 µm metal gauze. The screen is dried for 1 hour at 80 to 100° C. in a convection drying oven. The weight increase is based on the initial weight, standardized to a percentage and the difference to 100% is referred to as solubility (in %).

Determination of the Calcium-binding Capacity (CBC)

A mixture of a buffer stock solution and deionized water is introduced into a ErWeKa dissolution tester, stirred and heat-treated at 30° C. The buffer stock solution is an aqueous solution of glycine, sodium chloride, calcium chloride and sodium hydroxide in suitable concentrations. The calcium-sensitive electrode Model 932001 from Orion is dipped into the solution and calibrated by replenishing the solution with a calcium stock solution. This is carried out using the EA 940 evaluation unit from Orion. After replenishing, the solution has a water hardness of 17 degrees German water hardness. At the same time as the addition of the substance under investigation (1 g), the Orion EA 940 is started. The pH of the measurement solution is 10.2. The Orion EA 940 gives the concentration of free calcium ions at specific time intervals. Using the known initial weight of calcium, the concentration of free, unbonded calcium ions after 2 min is used to deduce the amount of bonded calcium, the so-called calcium-binding capacity. This is given in mg of $CaCO_3$/g.

Determination of the Phase Composition

A triturated solid sample is measured in a Philips PW1710 X-ray powder diffractometer (CuK alpha 2 radiation, wavelength 1.54439 Angström, accelerating potential 35 kV, heating current 28 mA, monochromator, scanning speed 3 degrees 2 theta per minute). The resulting intensities are evaluated as follows:

Substance characteristic peak (d value in Angström)

Alpha phase 3.29+/−0.07, typically 3.31

Beta phase 2.97+/−0.06

Delta phase 3.97+/−0.08

The contents in percent are calculated from the intensities $I_a$, $I_b$, $I_d$—measured in pulses—of the alpha, beta, delta phases in accordance with the following formulae:

Alpha content: $A[\%]=100*I_a/(I_a+I_b+I_d)$

Beta content: $B[\%]=1.41*100*I_b/(I_a+I_d)$

Delta content: $D[\%]=100-A-D$

To determine the fraction of nonphyllosilicatic sodium silicate (AM), the background (pulse) of the X-ray peak is determined at a d value of 2.65 Angström and converted into the percentage content using the following empirical formula:

$AM[\%]=(I_{am}-70)*100/450$

Compaction of Sodium Silicates

In a roll compactor (Hosokawa-Bepex, model: L200/50P), the corresponding starting material is conveyed between the compactor rollers using a stuffing screw (setting: stage 5). This is done at such a rate that a nip length of 50 mm results in a compaction pressure of from 140 to 160 kN. The roller rotation is set at stage 3 to 7, and the roller gap is 0.1 mm. The resulting sticks (length: about 50 mm, thickness: about 2 to 5 mm, width about 10 to 15 mm) are crushed in a hammer mill (Alpine, model UPZ) with a perforation diameter of 5 mm at a rotary speed of from 600 to 1400 rpm. From the crushed pulverulent product, oversize material is separated off (using a screen with a perforation diameter of 1.4 mm), and undersize material is separated off (perforation diameter 0.25 mm).

Preparation of the Test Detergents

The optical brighteners are stirred into a quarter of the amount of alkyl ethoxylate (AE) and mixed in a domestic multimixer (Braun) with half of the amount of soda. In a Lödige plowshare mixer, the remaining soda and all of the zeolite and polymer are mixed at 300 rpm for 15 minutes. Then, half of the remaining AE is sprayed on over the course of 5 minutes. The crystalline alkali metal phyllosilicate according to the invention is then added and mixed for 10 minutes. The remaining second half of the AE is then sprayed on over the course of a further 5 minutes. Finally, LAS, soap, antifoam, phosphonate and compound with optical brightener are added and subsequently mixed at 300 rpm for 10 minutes. In a tumble mixer, the mixture from the Lödige mixer is admixed, with low shear stress, with perborate, TAED and enzymes, and mixed for 15 minutes.

Washing Tests

In a standard domestic washing machine (model: Novotronic 927 WPS, Miele), specific test fabrics were washed at 60° C. and a water hardness of 18° German hardness with a test detergent at a dosing of 65 or 135 g/wash cycle. The test fabrics were supplemented with further laundry ballast (3.75 kg).

Determination of the Inorganic Incrustation

To determine the inorganic incrustation, test fabrics, which are a cotton terry fabric (Vossen), in each case a cotton double-rib fabric, polyester/cotton blend (type 20A) and standard cotton fabric (type 10A) from W äschereiforschung Krefeld Testgewebe GmbH and a standard cotton fabric from the Swiss Materials Testing Institute, St. Gallen, Switzerland were repeatedly washed (15 times) in accordance with the abovementioned procedure. After 15 washes, a sample was taken from each of the fabrics and ashed in a muffle furnace at a temperature of 1000° C. for a period of 24 hours. The weights of the residues are calculated based on the amounts of fabric (weights) used.

Determination of Detergency (D)

In each case 2 swatches of 5 different artificially soiled fabrics (WFK 10C, WFK 10D, WFK 20D, WFK 30D from Wäscherei-forschung Krefeld Testgewebe GmbH) were added to five different wash cycles and washed. The cloths were ironed, and the reflectances were determined four times using an Elrepho 3000 whiteness measuring instrument from Datacolor on each of the test swatches without UV excitation (using a UV blocking filter). The reflectance differences (delta R) are calculated by subtracting the reflectances after washing from the reflectances before washing (delta R=R (after washing) [%]−R (before washing) [%]).

The reflectances of the swatches before washing were determined prior to the test series using the same whiteness measuring instrument. Listed here is the average of all reflectance differences of all fabrics.

Tableting of Detergents

For tableting, the detergent formulation is mixed and compressed to the appropriate shape using a Matra tableting press. The compaction pressure can be between 12 and 0.3 $kN/cm^2$. The compact has a height of 18 mm and a diameter of 41 mm.

Preparation of the Machine Dishwashing Detergents

The components phosphate, crystalline alkali metal silicate according to the invention, soda, sodium citrate and polymer were introduced into a Lödige plowshare mixer and thoroughly mixed. The alkyl ethoxylate is then sprayed on. Finally, enzymes, perfume, percarbonate or perborate and TAED are mixed in.

EXAMPLES

Example 1

(Comparison)

250 kg of water glass with a percentage composition $Na_2O/SiO_2/H_2O$=15.4/30.1/54.5 (% by weight) are spray-dried in a laboratory spray dryer (spray tower) from Anhydro to give an amorphous sodium silicate having an active substance content of 81.5%. 15 kg of this amorphous sodium silicate are heat-treated at 720° C. for 90 minutes in a muffle furnace (Nabertherm, model W1000/H). The chilled product (about 10 kg) is pulverized using a jaw crusher and a disk mill. This is repeated twice more.

Example 2

(Comparison)

210 g of anhydrous soda are added to 7 kg of the ground product from Example 1 and ground for 50 min using a U 280A0 ball mill from Welte which is lined on the inside with metal and whose drum rotates at about 50 rpm. The grinding media used are 44 kg of porcelain balls. This is repeated twice more and the batches are combined.

Example 3

(Comparison)

Approximately 15 kg of the material from Example 2 are compacted in accordance with the general procedure for the compaction of sodium silicates. 6.4 kg of acceptable material, 6.6 kg of oversize material and 2.0 kg of undersize material are obtained.

Example 4

367 g of finely ground anhydrous soda are added to 15 kg of the spray-dried amorphous sodium silicate from Example 1 in a tumble mixer and mixed for 1 h. The mixture is heat-treated at 720° C. for 90 minutes in a muffle furnace (Nabertherm, model W1000/H). The chilled material (about 10 kg) is pulverized using a jaw crusher and a disk mill.

Example 5

2048 g of anhydrous soda are dissolved in 150 kg of water glass having the composition as in Example 1, and the solution is spray-dried in a laboratory spray dryer (spray tower) from Anhydro to give an amorphous sodium silicate having an active substance content of 82%. 15 kg of the amorphous sodium silicate are heat-treated at 720° C. for 90 min in a muffle furnace (Nabertherm, model W1000/H). This is repeated twice more. The chilled product (about 30 kg) is pulverized using a jaw crusher and a disk mill.

Example 6

7 kg of the ground product from Example 5 are ground for 50 min using a U 280A0 ball mill from Welte which is lined on the inside with metal and whose drum rotates at about 50 rpm. The grinding media used are 44 kg of porcelain balls.

Example 7

About 15 kg of the material from Example 5 are compacted in accordance with the general procedure for the compaction of sodium silicates. 5.8 kg of acceptable material, 7.0 kg of oversize material and 2.3 kg of undersize material are obtained.

Example 8

7 kg of the product from Example 7 are ground for 45 min using a U 280A0 ball mill from Welte which is lined on the inside with metal and whose drum rotates at about 50 rpm. The grinding media used are 44 kg of porcelain balls.

Example 9

675 g of anhydrous soda are dissolved in 50 kg of water glass having a percentage composition $Na_2O/SiO_2/H_2O = 16.4/28.6/55$ (% by weight), and the solution is spray-dried in a laboratory spray dryer (spray tower) from Anhydro to give an amorphous sodium silicate having an active substance content of 82.2%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 10

675 g of anhydrous soda are dissolved in 50 kg of water glass having a percentage composition $Na_2O/SiO_2/H_2O = 15/30/55$ (% by weight), and the solution is spray-dried in a laboratory spray dryer (spray tower) from Anhydro to give an amorphous sodium silicate having an active substance content of 82.5%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 11

683 g of anhydrous soda are dissolved in 50 kg of water glass having the composition as in Example 1, and the solution is spray-dried in a laboratory spray dryer (spray tower) from Anhydro to give an amorphous sodium silicate having an active substance content of about 83%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 12

1223 g of finely ground anhydrous soda are added to 15 kg of the spray-dried amorphous sodium silicate from Example 1 in a tumble mixer and mixed for 1 h. The mixture is heat-treated at 720° C. for 90 min in a muffle furnace (Nabertherm, model W1000/H). The chilled material (about 10 kg) is pulverized using a jaw crusher and a disk mill.

Example 13

3668 g of finely ground anhydrous soda are added to 15 kg of the spray-dried amorphous sodium silicate from Example 1 in a tumble mixer and mixed for 1 h. The mixture is heat-treated at 720° C. for 90 min in a muffle furnace (Nabertherm, model W1000/H). The chilled material (about 10 kg) is pulverized using a jaw crusher and a disk mill.

Example 14

(Comparison)

1138 g of anhydrous sodium sulfate are dissolved in 50 kg of water glass having the composition as in Example 1, and the solution is spray-dried in a laboratory spray dryer (spray tower) from Anhydro to give an amorphous sodium silicate having an active substance content of about 83%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 15

637 g of anhydrous sodium sulfate and 501 g of anhydrous soda are dissolved in 50 kg of water glass having the composition as in Example 1, and the solution is spray-dried in a laboratory spray dryer (spray tower) from Anhydro to give an amorphous sodium silicate having an active substance content of about 83%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 16

(Comparison)

1104 g of disodium hydrogenphosphate dihydrate are dissolved in 50 kg of water glass having the composition as in Example 1, and the solution is spray-dried in a laboratory spray dryer (spray tower) from Anhydro to give an amorphous sodium silicate having an active substance content of about 83%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 17/I 1104 g of disodium hydrogenphosphate dihydrate and 683 g of anhydrous soda are dissolved in 50 kg of water glass having the composition as in Example 1, and the solution is spray-dried in a laboratory spray dryer (spray tower) from Anhydro to give an amorphous sodium silicate having an active substance content of about 83%.

15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 17/II 1104 g of disodium hydrogenphosphate dihydrate, 683 g of anhydrous sodium sulfate and 683 g of anhydrous soda are dissolved in 50 kg of water glass having the composition as in Example 1, and the solution is spray-dried in a laboratory spray dryer (spray tower) from Anhydro to give an amorphous sodium silicate having an active substance content of about 83%. 15 kg of the amorphous sodium silicate are heat-treated at 720° C. for 90 min in a muffle furnace (Nabertherm, model W1000/H). The chilled product (about 10 kg) is pulverized using a jaw crusher and a disk mill.

Example 18

(Comparison)

A test ultracompact heavy-duty detergent comprising 35% of commercially available zeolite was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 3.70%, detergency 16.5%.

Example 19

(Comparison)

A test ultracompact heavy-duty detergent comprising commercial zeolite and silicate from Example 1 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 2.82%, detergency 18.6%.

Example 20

(Comparison)

A test ultracompact heavy-duty detergent comprising commercial zeolite and silicate from Example 2 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 2.39%, detergency 17.3%.

Example 21

A test ultracompact heavy-duty detergent comprising 35% of silicate from Example 5 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.68%, detergency 25.4%.

Example 22

A test ultracompact heavy-duty detergent comprising commercial zeolite and silicate from Example 5 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.27%, detergency 23.4%.

Example 23

A test ultracompact heavy-duty detergent comprising commercial zeolite and silicate from Example 7 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.20%, detergency 22.9%.

Example 24

A test ultracompact heavy-duty detergent comprising commercial zeolite and silicate from Example 9 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.23%, detergency 24.8%.

Example 25

A test ultracompact heavy-duty detergent comprising commercial zeolite and silicate from Example 10 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.53%, detergency 23.7%.

Example 26

A test ultracompact heavy-duty detergent comprising commercial zeolite and silicate from Example 13 was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 1.17%, detergency 22.8%.

Example 27

A test ultracompact heavy-duty detergent comprising commercial zeolite and silicate from Example 17/I was prepared in accordance with the general procedure preparation of the test detergents". The formation of inorganic incrustations and the detergency were investigated in accordance with the general procedures "Washing tests", "Determination of the inorganic incrustation" and "Determination of the detergency" in model washing tests: inorganic incrustation 0.89%, detergency 25.2%.

Example 28

A test ultracompact heavy-duty detergent comprising commercial zeolite and silicate from Example 7 and having the more detailed composition given in Table 3 was prepared in accordance with the general procedure preparation of the test detergents".

Example 29

A test ultracompact heavy-duty detergent comprising silicate from Example 5 and having the more detailed composition given in Table 3 was prepared in accordance with the general procedure preparation of the test detergents".

Example 30

A test heavy-duty detergent comprising phosphate and silicate from Example 5 and having the more detailed composition given in Table 3 was prepared in accordance with the general procedure preparation of the test detergents".

Example 31

A test heavy-duty detergent comprising zeolite and silicate from Example 5 and having the more detailed composition given in Table 3 was prepared in accordance with the general procedure preparation of the test detergents".

Example 32

A test heavy-duty detergent comprising zeolite and silicate from Example 7 and having the more detailed composition given in Table 3 was prepared in accordance with the general procedure preparation of the test detergents".

Example 33

A test water softener comprising zeolite and silicate from Example 7 and having the more detailed composition given in Table 3 was prepared in accordance with the general procedure preparation of the test detergents".

Examples 34 to 40

Detergent tablets were compressed with zeolite and silicate from Example 7 in accordance with the general procedure preparation of the test detergents" and Tables 3 and 4.

Example 41

A test heavy-duty detergent comprising zeolite and silicate from Example 5 and having the more detailed composition given in Table 4 was prepared in accordance with the general procedure preparation of the test detergents".

Example 42

A test heavy-duty detergent comprising zeolite and silicate from Example 7 and having the more detailed composition given in Table 4 was prepared in accordance with the general procedure preparation of the test detergents".

Example 43

A test heavy-duty detergent comprising zeolite and silicate from Example 10 and having the more detailed composition given in Table 4 was prepared in accordance with the general procedure preparation of the test detergents".

Example 44

A test heavy-duty detergent comprising zeolite and silicate from Example 12 and having the more detailed composition given in Table 4 was prepared in accordance with the general procedure preparation of the test detergents".

Example 45

A test heavy-duty detergent comprising silicate from Example 5 and having the more detailed composition given in Table 4 was prepared in accordance with the general procedure preparation of the test detergents".

Example 46

A test heavy-duty detergent comprising silicate from Example 5 and having the more detailed composition given in Table 4 was prepared in accordance with the general procedure preparation of the test detergents".

Example 47

A test stain-removal salt comprising silicate from Example 7 and having the more detailed composition given in Table 4 was prepared in accordance with the general procedure preparation of the test detergents".

Examples 48 to 54

Machine dishwashing detergents were prepared in accordance with the general procedure "Preparation of the machine dishwashing detergents" (Table 5).

Example 55

A machine dishwashing detergent gel is prepared by mixing waterglass, phosphate, soda, sodium hydroxide, phosphonate, polymer, alkanesulfonate and phosphoric ester using a dispergator (Ultraturrax, Hanke und Kunkel). Finally, silicate and sodium hypochlorite are briefly mixed in (Table 6).

TABLE 1a

| | | \multicolumn{9}{c}{Examples} | | | | | | | | |
|---|---|---|---|---|---|---|---|---|---|---|
| | | 1 (Comp.) | 2 (Comp.) | 3 (Comp.) | 4 | 5 | 6 | 7 | 8 | 9 |
| Phases | % Alpha | 2.9 | 3.6 | 8.2 | 15.6 | 3.0 | | | | 14.6 |
| | % Beta | 7.4 | 10.5 | 13.2 | 4.2 | 20.7 | | | | 7.3 |
| | % Delta | 89.7 | 85.9 | 78.6 | 80.2 | 76.3 | | | | 78.1 |
| CBC | mg of $CaCO_3$/g, 2 min | 173.3 | 152 | | 190 | 210 | — | — | — | 198 |
| Particle size | d 50 | 22.96 | 19.3 | *516.9 | 22.26 | 20.5 | 16.1 | *661 | 27.2 | 16.1 |
| | d 95 | 97.74 | 95.9 | | 83.02 | 97.1 | 43.6 | 1180 | 169.7 | 45.22 |
| Solubility | % of undissolved material | 90.6 | 92.3 | 76.4 | 46.4 | 18.2 | 16.8 | 15.6 | 15.9 | 23.2 |

TABLE 1b

| | | \multicolumn{9}{c}{Examples} | | | | | | | | |
|---|---|---|---|---|---|---|---|---|---|---|
| | | 10 | 11 | 12 | 13 | 14 (Comp.) | 15 | 16 (Comp.) | 17I | 17II |
| Phases | % Alpha | 10.9 | 3.1 | 2.9 | 13.2 | 7.3 | 0.0 | 5.4 | 7.0 | 11.1 |
| | % Beta | 2.6 | 9.2 | 15.4 | 8.2 | 14.0 | 4.6 | 9.2 | 8.3 | 6.5 |
| | % Delta | 86.5 | 87.8 | 81.8 | 78.6 | 80.6 | 95.4 | 85.4 | 84.7 | 82.4 |
| CBC | mg of $CaCO_3$/g, 2 min | 190 | 187 | 190.2 | 203.8 | 182.3 | 205 | 234.5 | 232.5 | 230.2 |
| Particle size | d 50 | 19.52 | 17.81 | 24.1 | 19.8 | 23.8 | 22.5 | 21.9 | 19.3 | 20.5 |
| | d 95 | 44.73 | 62.23 | 90.05 | 63.5 | 96.2 | 92.6 | 91.2 | 96.7 | 89.4 |
| Solubility | % of undissolved material | 27.3 | 20.4 | 46.3 | 51 | 86.3 | 18.8 | 28.4 | 18.6 | 17.9 |

TABLE 2

| | \multicolumn{10}{c}{Examples} | | | | | | | | | |
|---|---|---|---|---|---|---|---|---|---|---|
| | 18 (Comp.) | 19 (Comp.) | 20 (Comp.) | 21 | 22 | 23 | 24 | 25 | 26 | 27 |
| Zeolite A [%] | 35 | 20 | 20 | — | 20 | 20 | 20 | 20 | 20 | 20 |
| Silicate from Ex. 1 [%] | — | 15 | — | — | — | — | — | — | — | — |
| Silicate from Ex. 2 [%] | — | — | 15 | — | — | — | — | — | — | — |
| Silicate from Ex. 5 [%] | — | — | — | 35 | 15 | — | — | — | — | — |
| Silicate from Ex. 7 [%] | — | — | — | — | — | 15 | — | — | — | — |
| Silicate from Ex. 9 [%] | — | — | — | — | — | — | 15 | — | — | — |
| Silicate from Ex. 10 [%] | — | — | — | — | — | — | — | 15 | — | — |
| Silicate from Ex. 12 [%] | — | — | — | — | — | — | — | — | 15 | — |
| Silicate from Ex. 17/I [%] | — | — | — | — | — | — | — | — | — | 15 |
| Polymer 1 [%] | 6 | 6 | 6 | 6 | 6 | 6 | 6 | 6 | 6 | 6 |
| Soda [%] | 13 | 13 | 13 | 13 | 13 | 13 | 13 | 13 | 13 | 13 |
| Percarbonate [%] | 18 | 18 | 18 | 18 | 18 | 18 | 18 | 18 | 18 | 18 |
| TAED 1 [%] | 5 | 5 | 5 | 5 | 5 | 5 | 5 | 5 | 5 | 5 |
| LAS [%] | 9 | 9 | 9 | 9 | 9 | 9 | 9 | 9 | 9 | 9 |
| AE 1 [%] | 4 | 4 | 4 | 4 | 4 | 4 | 4 | 4 | 4 | 4 |
| AE 2 [%] | 4 | 4 | 4 | 4 | 4 | 4 | 4 | 4 | 4 | 4 |
| Soap [%] | 1.5 | 1.5 | 1.5 | 1.5 | 1.5 | 1.5 | 1.5 | 1.5 | 1.5 | 1.5 |
| Antifoam [%] | 1.0 | 1.0 | 1.0 | 1.0 | 1.0 | 1.0 | 1.0 | 1.0 | 1.0 | 1.0 |
| Enzyme 1 [%] | 1.5 | 1.5 | 1.5 | 1.5 | 1.5 | 1.5 | 1.5 | 1.5 | 1.5 | 1.5 |
| Enzyme 3 [%] | 1.5 | 1.5 | 1.5 | 1.5 | 1.5 | 1.5 | 1.5 | 1.5 | 1.5 | 1.5 |
| Opt. brightener [%] | 0.50 | 0.50 | 0.50 | 0.50 | 0.50 | 0.50 | 0.50 | 0.50 | 0.50 | 0.50 |
| Concentration [%] | 72 | 72 | 72 | 72 | 72 | 72 | 72 | 72 | 72 | 72 |
| Inorg. incrustation [%] | 3.70 | 2.82 | 2.39 | 1.68 | 1.27 | 1.20 | 1.23 | 1.53 | 1.17 | 0.89 |
| Detergency [%] | 16.5 | 18.6 | 17.3 | 25.4 | 23.4 | 22.9 | 24.8 | 23.7 | 22.8 | 25.2 |

TABLE 3

| | \multicolumn{10}{c}{Examples} | | | | | | | | | |
|---|---|---|---|---|---|---|---|---|---|---|
| | 28 | 29 | 30 | 31 | 32 | 33 | 34 | 35 | 36 | 37 |
| Zeolite A [%] | 20 | — | — | 20 | 30 | 40 | — | 15 | 25 | — |
| Phosphate 1 [%] | — | — | 25 | — | — | — | — | — | — | — |

TABLE 3-continued

| | Examples | | | | | | | | | |
|---|---|---|---|---|---|---|---|---|---|---|
| | 28 | 29 | 30 | 31 | 32 | 33 | 34 | 35 | 36 | 37 |
| Silicate from Ex. 5 [%] | — | 45 | 10 | 5 | — | — | — | — | — | — |
| Silicate from Ex. 7 [%] | 15 | — | — | — | 10 | 15 | 30 | 15 | 5 | 30 |
| Polymer 1 [%] | 6 | — | — | 3 | 7 | 7 | 4 | 4 | 4 | 4 |
| Soda [%] | 13 | — | — | 18 | — | 15 | 14 | 12 | 10 | 12 |
| Bicarbonate [%] | — | 15 | — | — | 18 | 5 | 5 | 5 | 5 | 5 |
| Perborate mh [%] | 18.0 | — | — | — | — | — | — | — | — | — |
| Perborate th [%] | — | — | 20 | 20 | — | — | — | — | — | — |
| Percarbonate [%] | — | 18 | — | — | — | — | 12 | 12 | 12 | 12 |
| TAED 1 [%] | 5 | 5 | — | 2.5 | — | — | 4 | 4 | 4 | 4 |
| LAS [%] | 9 | — | 6.7 | 9 | 8.0 | — | 7 | 7 | 7 | 7 |
| AE 1 [%] | 4 | 10 | 2.2 | 5 | 10 | 2 | — | — | — | — |
| AE 2 [%] | 4 | — | — | — | — | — | — | — | — | — |
| AE 3 [%] | — | — | — | — | — | — | 4 | 4 | 4 | 4 |
| Soap [%] | 1.5 | — | — | — | 1.0 | 2.0 | — | — | — | — |
| Antifoam [%] | 1.0 | 1.0 | 0.6 | 0.6 | 1.0 | — | — | — | — | — |
| Enzyme 1 [%] | 1.5 | 1.5 | 0.6 | 0.6 | 1.5 | — | — | — | — | — |
| Enzyme 3 [%] | 1.5 | 1.5 | 0.6 | 0.6 | 1.5 | — | — | — | — | — |
| Opt. brightener [%] | 0.50 | 0.50 | 0.20 | 0.20 | — | — | — | — | — | — |
| Phosphonate 1 [%] | — | 0.2 | 0.1 | 0.1 | 0.2 | — | — | — | — | — |
| Citric acid [%] | — | — | — | — | 2 | 5 | 6 | 6 | 6 | 6 |
| Polyvinylpyrrolidone [%] | — | — | — | — | 1 | — | — | — | — | — |
| Soil release polymer [%] | — | — | — | — | 0.8 | — | — | — | — | — |
| CMC [%] | — | — | — | — | 1 | — | — | — | — | — |
| Cellulose [%] | — | — | — | — | — | — | 5.0 | 7.0 | 9.0 | — |
| Sulfate [%] | — | 2.3 | 34.0 | 15.4 | 7.0 | 9 | — | — | — | — |
| Acetate th [%] | — | — | — | — | — | — | 9.0 | 9.0 | 9.0 | 16.0 |
| Dosing [%] | 72 | 65 | 135 | 135 | 72 | 30 + 65 | 2*40 | 2*40 | 2*40 | 2*40 |

TABLE 4

| | Examples | | | | | | | | | |
|---|---|---|---|---|---|---|---|---|---|---|
| | 38 | 39 | 40 | 41 | 42 | 43 | 44 | 45 | 46 | 47 |
| Zeolite A [%] | 15 | — | 15 | 31 | 31 | 16 | 29.3 | — | — | — |
| Silicate from Ex. 5 [%] | — | — | — | 20 | — | — | — | 12 | 5 | — |
| Silicate from Ex. 7 [%] | 15 | 31 | 16 | — | 20 | — | — | — | — | 8.6 |
| Silicate from Ex. 10 [%] | — | — | — | — | — | 39.8 | — | — | — | — |
| Silicate from Ex. 12 [%] | — | — | — | — | — | — | 3.6 | — | — | — |
| Polymer 1 [%] | 4 | 7 | 7 | 5 | — | 3 | 2.5 | 2 | 1.8 | — |
| Soda [%] | 12 | 14 | 14 | — | 5 | 5.0 | 40.7 | 29 | 76 | 34 |
| Bicarbonate [%] | 5 | 10 | 10 | — | — | — | — | — | — | — |
| Perborate mh [%] | — | — | — | — | — | — | — | — | 2.8 | — |
| Perborate th [%] | — | — | — | — | — | — | — | — | 2.4 | — |
| Percarbonate [%] | 12 | 12 | 12 | — | — | — | — | — | — | 21 |
| TAED 1 [%] | 4 | 4 | 4 | — | — | — | — | — | — | 7.2 |
| LAS [%] | 7 | 7 | 7 | 10 | 30 | — | 7.2 | 6.5 | — | — |
| Alkanesulfonate [%] | — | — | — | — | — | — | 8.5 | 4.5 | 8.5 | 5 |
| AE 1 [%] | — | — | — | 15 | 4 | 17.9 | 3.1 | — | 3.5 | — |
| AE 2 [%] | — | — | — | 10 | 3 | — | — | — | — | — |
| AE 3 [%] | 4.0 | 4 | 4 | — | — | — | — | — | — | — |
| Soap [%] | — | — | — | — | — | 13.1 | — | — | — | 1 |
| Enzyme 1 [%] | — | — | — | 1.5 | 0.5 | 0.5 | 0.3 | — | — | — |
| Enzyme 3 [%] | — | — | — | 1.5 | 0.5 | 0.5 | 0.3 | — | — | — |
| Opt. brightener [%] | — | — | — | — | 0.5 | — | — | — | — | — |
| Citric acid [%] | 6.0 | 11 | 11 | — | — | — | — | — | — | — |
| Sulfate [%] | — | — | — | 6 | 6 | 4.2 | 5 | — | — | 21.7 |
| Sodium chloride [%] | — | — | — | — | — | — | — | 46 | — | 1.7 |
| Acetate th [%] | 16.0 | — | — | — | — | — | — | — | — | — |
| Dosing [%] | 2*40 | 2*40 | 2*40 | 0.5 g/l | 0.5 g/l | 0.5 g/l | 80 | 80 | 150 | 40 |

TABLE 5

| | Examples | | | | | | |
|---|---|---|---|---|---|---|---|
| | 48 | 49 | 50 | 51 | 52 | 53 | 54 |
| Phosphate 2 [%] | — | — | 25.0 | 40.0 | 47.0 | 20.0 | 20.0 |
| Metasilicate pentahydrate [%] | — | — | — | — | — | 47.0 | 3.0 |
| Silicate from Ex. 7 [%] | 20.0 | 5.0 | 15.0 | 15.0 | 5.2 | 3.0 | 47.0 |
| Soda [%] | 22.7 | 32.7 | 30.0 | 24.7 | 27.5 | 17.5 | 17.0 |

TABLE 5-continued

| | Examples | | | | | | |
|---|---|---|---|---|---|---|---|
| | 48 | 49 | 50 | 51 | 52 | 53 | 54 |
| Sodium hydroxide [%] | — | — | — | — | — | 8.0 | 8.0 |
| Citrate th [%] | 30.0 | 35.0 | — | — | — | — | — |
| Percarbonate [%] | 10.0 | 10.0 | — | — | — | — | — |
| Perborate mh [%] | — | — | 10.0 | 10.0 | 10.0 | — | — |
| NaDCC [%] | — | — | — | — | — | 1.0 | 4.0 |
| Polymer 2 [%] | 7.5 | 7.5 | 5.0 | 3.5 | 3.5 | — | — |
| TAED 2 [%] | 5.0 | 5.0 | 2.0 | 2.0 | 2.0 | — | — |
| Enzyme 2 [%] | 1.0 | 1.0 | 1.5 | 1.0 | 1.0 | — | — |
| Enzyme 4 [%] | 2.0 | 2.0 | 2.5 | 2.0 | 2.0 | — | — |
| AE 4 [%] | 1.5 | 1.5 | 1.5 | 1.5 | 1.5 | 3.5 | 1.0 |
| Perfume [%] | 0.3 | 0.3 | 1.5 | 0.3 | 0.3 | — | — |
| Sulfate [%] | — | — | 6.0 | — | — | — | — |
| Dosing [g] | 20 | 20 | 20 | 20 | 20 | 2 g/l | 2 g/l |

TABLE 6

| | | Example 55 |
|---|---|---|
| Phosphate 3 | [%] | 22.0 |
| Builder silicate from Ex. 6 | [%] | 5.5 |
| Soda | [%] | 1.0 |
| Sodium hydroxide | [%] | 1.0 |
| Phosphonate 2 | [%] | 0.6 |
| Polymer 3 | [%] | 1.5 |
| Alkanesulfonate | [%] | 1.5 |
| Water glass | [%] | 37.0 |
| Phosphoric ester | [%] | 0.4 |
| Sodium hypochlorite | [%] | 9.0 |
| Water | [%] | 20.5 |
| Dosing | [g] | 40 |

Substances used:

| | |
|---|---|
| Zeolite A: | Wessalith P, Degussa |
| Phosphate 1: | Sodium tripolyphosphate from Thermphos Intl. |
| Phosphate 2: | Makrophos 1018, BK Giulini |
| Phosphate 3: | Thermphos NW coarse |
| Polymer 1: | Sokalan CP5 powder, BASF |
| Polymer 2: | Sokalan CP45, BASF |
| Polymer 3: | Sokalan CP5 liquid, BASF |
| Soda: | Heavy soda, Matthes&Weber |
| Bicarbonate: | Solvay |
| Percarbonate: | Oxyper C, Solvay Interox |
| Perborate monohydrate (perborate mh): | Degussa |
| Perborate tetrahydrate (perborate th): | Degussa |
| TAED 1: | TAED 4049, Clariant |
| TAED 2: | TAED 3873, Clariant |
| LAS: | Marlon ARL, Hüls |
| AE 1: | Genapol OAA 080, Clariant |
| AE 2: | Genapol OAA 040, Clariant |
| AE 3: | Genagen 81MEE100, Clariant |
| AE 4: | Genapol 2822, Clariant |
| Soap: | Liga base soap HM11E |
| Antifoam: | 11.Pwd.ASP3, Wacker |
| Enzyme 1: | Termamyl 60T, Solvay |
| Enzymes | |
| Enzyme 2: | Termamyl 120T, Solvay |
| Enzymes | |
| Enzyme 3: | Savinase 6.0 TW, Solvay |
| Enzymes | |
| Enzyme 4: | Savinase 6.0 TW, Solvay |
| Enzymes | |
| Optical brightener: | Tinopal CBS-X, Ciba |
| Phosphonate 1: | Dequest 2041, Monsanto |
| Phosphonate 2: | Dequest 200, Monsanto |
| Citric acid: | from Jungbunzlauer |
| Polyvinylpyrrolidone: | Sokalan HP50, BASF |
| Soil release polymer: | SRC 1, Clariant |
| CMC: | Tylose 2000, Clariant |
| Cellulose: | Arbocell, Rettenmaier |
| Sulfate: | from Solvay |
| Sodium acetate trihydrate (acetate th): | Riedel de Haen |
| Fragrance: | lemon fragrance 78122D, Orissa |
| Sodium hydroxide: | Microprills 100%, Riedel de Haen |
| Alkanesulfonate: | Hostapur SAS 60, Clariant |
| Water glass: | 45.5% of active substance, modulus 2.0, Clariant France |
| Phosphoric ester: | Hordaphos 158, Clariant |
| Sodium hypochlorite: | Celanese GmbH |
| Trisodium citrate trihydrate (citrate th): | Rettenmaier |
| Metasilicate pentahydrate: | van Baerle |
| Sodium dichlorodiisocyanurate (NaDCC): | from Olin Chemicals |
| Sodium chloride | Merck KGaA |

What is claimed is:

1. A crystalline alkali metal phyllosilicate of the formula

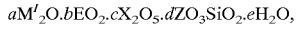

$aM^I_2O \cdot bEO_2 \cdot cX_2O_5 \cdot dZO_3SiO_2 \cdot eH_2O$, in which $M^I$ is an alkali metal, E is an element selected from the group consisting of carbon, germanium, tin, lead, or mixtures thereof, X is an element of the fifth main group and Z is an element of the sixth main group of the Periodic Table of the Elements and the following also applies:

$0.25 \leq a \leq 6.25$ $2.5 \cdot 10^{-4} \leq b \leq 5.63$ $0 \leq c \leq 2.81$ $0 \leq d \leq 5.63$ $0 \leq e \leq 15.3$.

2. The crystalline alkali metal phyllosilicate as claimed in claim 1, wherein d=0 and $0.25 \leq a \leq 6.25$ $2.5 \cdot 10^{-4} \leq b \leq 5.63$ $1.25 \cdot 10^{-4} \leq c \leq 2.81$ $3.13 \cdot 10^{-4} \leq e \leq 15.3$.

3. The crystalline alkali metal phyllosilicate as claimed in claim 1, wherein c=0 and $0.25 \leq a \leq 6.25$ $2.5 \cdot 10^{-4} \leq b \leq 5.63$ $2.5 \cdot 10^{-4} \leq d \leq 5.63$ $0 \leq e \leq 12.5$.

4. The crystalline alkali metal phyllosilicate as claimed in claim 1, wherein c=0 and d=0 and $0.25 \leq a \leq 6.25$ $2.5 \cdot 10^{-4} \leq b \leq 5.63$ $0 \leq e \leq 12.5$.

5. The crystalline alkali metal phyllosilicate as claimed in claim 1, wherein the alkali metal ($M^I$) is lithium, sodium, potassium, cesium or mixtures thereof.

6. The crystalline alkali metal phyllosilicate as claimed in claim 1, wherein the element of the fifth main group (X) is nitrogen, phosphorus, arsenic, antimony, bismuth or mixtures thereof.

7. The crystalline alkali metal phyllosilicate as claimed in claim 1, wherein the element of the sixth main group (Z) is sulfur, selenium, tellurium or mixtures thereof.

8. The crystalline alkali metal phyllosilicate as claimed in claim 1, which comprises up to 10% by weight of foreign constituents.

9. The crystalline alkali metal phyllosilicate as claimed in claim 1, wherein the foreign constituents are alkaline earth metal ions (magnesium, calcium, strontium, barium), aluminum, zinc, iron, titanium, vanadium, chromium, manganese, cobalt, nickel, boron, fluoride, chloride, bromide and/or iodide.

10. A process for the preparation of sodium silicates of the formula $$a M'_2 O \cdot b EO_2 \cdot c X_2 O_5 \cdot d ZO_3 \cdot SiO_2 \cdot e H_2 O,$$

in which $M^I$ is an alkali metal, E is an element selected from the group consisting of carbon, germanium, tin, lead, or mixtures thereof; X is an element of the fifth main group and Z is an element of the sixth main group of the Periodic Table of the Elements and the following also applies: $0.25 \leq a \leq 6.25$; $2.5 \cdot 10^{-4} \leq b \leq 5.63$; $0 \leq c \leq 2.81$; $0 \leq d \leq 5.63$; $0 \leq e \leq 15.3$, which comprises mixing a sodium silicate-containing starting material with one or more compounds which comprise the components $M^I$, E, X and/or Z, and then heat-treating the mixture.

11. The process as claimed in claim 10, wherein the sodium silicate-containing starting material is an alkali metal water glass or spray-dried amorphous sodium silicate.

12. The process as claimed in claim 11, wherein alkali metal water glasses are mixed with alkali metal carbonate, alkali metal sulfate and/or alkali metal phosphates, the resulting product is spray-dried and then heat-treated.

13. The process as claimed in claim 11, wherein spray-dried amorphous sodium silicate is mixed with alkali metal carbonate, alkali metal sulfate and/or alkali metal phosphates and then heat-treated.

14. The process as claimed in claim 11, wherein the heat treatment is carried out at temperatures of from 700 to 1300 K.

15. A detergent and cleaner which comprises a crystalline alkali metal phyllosilicate as claimed in claim 1.

16. The detergent and cleaner as claimed in claim 15, which comprises 0.5 to 90% by weight of the crystalline alkali metal phyllosilicate, 0.5 to 70% by weight of cobuilders, to 100% by weight of further customary ingredients.

17. The detergent and cleaner as claimed in claim 15, which comprises 0.5 to 90% by weight of the crystalline alkali metal phyllosilicate, 0.5 to 60% by weight of surfactant, to 100% by weight of further customary ingredients.

18. The detergent and cleaner as claimed in claim 15, which comprises 0.5 to 90% by weight of the crystalline alkali metal phyllosilicate, 0.5 to 60% by weight of bleaching-active agents, to 100% by weight of further customary ingredients.

19. The detergent and cleaner as claimed in claim 15, which comprises 0.5 to 90% by weight of the crystalline alkali metal phyllosilicate, 0.5 to 70% by weight of cobuilders, 0.5 to 60% by weight of surfactant, to 100% by weight of further customary ingredients.

20. The detergent and cleaner as claimed in claim 15, which comprises 0.5 to 90% by weight of the crystalline alkali metal phyllosilicate, 0.5 to 70% by weight of cobuilders, 0.5 to 60% by weight of bleaching-active agents, to 100% by weight of further customary ingredients.

21. The detergent and cleaner as claimed in claim 15, which comprises 0.5 to 90% by weight of the crystalline alkali metal phyllosilicate, 0.5 to 70% by weight of cobuilders, 0.5 to 60% by weight of surfactant, 0.5 to 60% by weight of bleaching-active agents, to 100% by weight of further customary ingredients.

22. The detergent and cleaner as claimed in claim 15, which comprises 0.5 to 90% by weight of the crystalline alkali metal phyllosilicate, 0.5 to 70% by weight of electrolyte donor, to 100% by weight of further customary ingredients.

23. The detergent and cleaner as claimed in claim 15, comprises 50 to 99% by weight of the crystalline alkali metal phyllosilicate, 0.01 to 10% by weight of dye, to 100% by weight of further customary ingredients.

24. The detergent and cleaner as claimed in claim 15, further cobuilders selected from the group consisting of crystalline aluminosilicates, mono-, oligo- or polymeric carboxylic acids, alkali metal carbonates, alkali metal ortho-, pyro- and polyphosphates, crystalline alkali metal silicates having a crystal lattice without a sheet structure and/or amorphous alkali metal silicates.

25. The detergent and cleaner as claimed in claim 15, further bleaching-active agent selected from the group consisting of perborates, percarbonates and/or enzymes.

26. The detergent and cleaner as claimed in claim 15, further comprising surfactants selected from the group consisting of anionic, cationic, nonionic and/or zwitterionic surfactants.

27. The detergent and cleaner as claimed in claim 15, further comprising electrolyte donors selected from the group consisting of sulfates, chlorides and/or borates.

* * * * *